May 28, 1957  W. V. SMITH  2,793,474
GAUGE FOR LAWN MOWER SHARPENING MACHINE
Filed April 2, 1956  2 Sheets-Sheet 1

W. V. Smith
INVENTOR
BY Snow & Co.
ATTORNEYS.

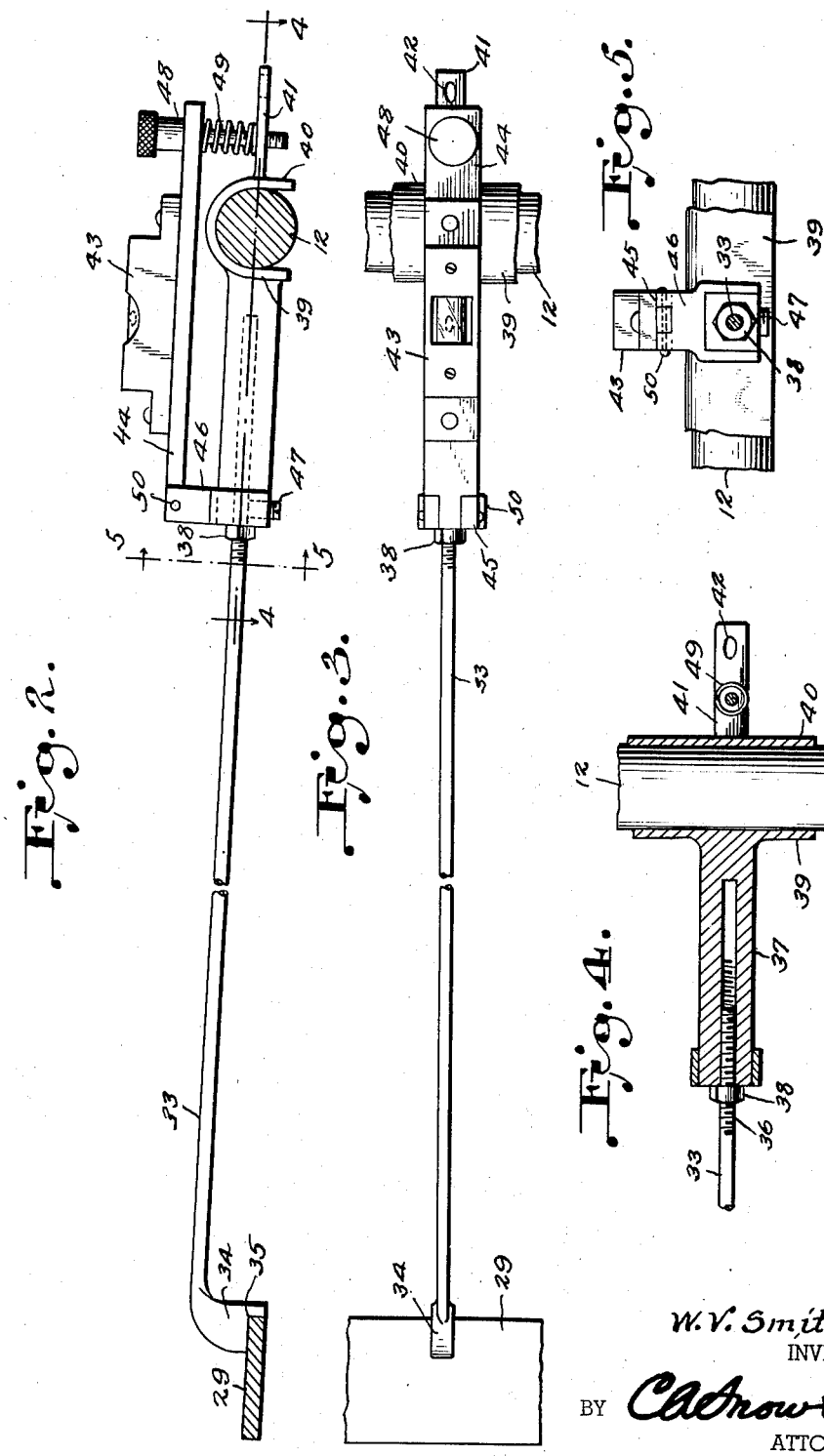

United States Patent Office 2,793,474
Patented May 28, 1957

2,793,474
GAUGE FOR LAWN MOWER SHARPENING MACHINE

William V. Smith, Greenville, Ill.

Application April 2, 1956, Serial No. 575,582

2 Claims. (Cl. 51—48)

This invention relates to a gauge for a lawn mower sharpener and is designed for use with the machine embodied in my copending application, Serial No. 300,406, filed July 23, 1952, for Apparatus for Sharpening a Lawn Mower, now Patent No. 2,755,600, issued July 24, 1956.

In the machine disclosed in my copending application the grinding operation is effected by a grinding wheel mounted on a swinging lever. The grinding wheel is guided in its transverse path along the reel of the mower by a guide means which engages the stationary cutter bar. When the grinding wheel gradually wears down the original adjustment of the machine is no longer correct. It is, therefore, an object of this invention to provide a gauge by means of which the original adjustment of the machine may be obtained very quickly.

Another object of this invention is to provide a gauge which is of simple construction and can be easily and quickly applied to the machine.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Fig. 2 is a detail side elevation partly broken away of the gauge showing portions of the lawn mower and sharpening machine in section.

Fig. 3 is a plan view partly broken away of the gauge.

Fig. 4 is a fragmentary sectional view taken on line 4—4 of Fig. 2.

Fig. 5 is a fragmentary sectional view taken on line 5—5 of Fig. 2.

Figure 1:
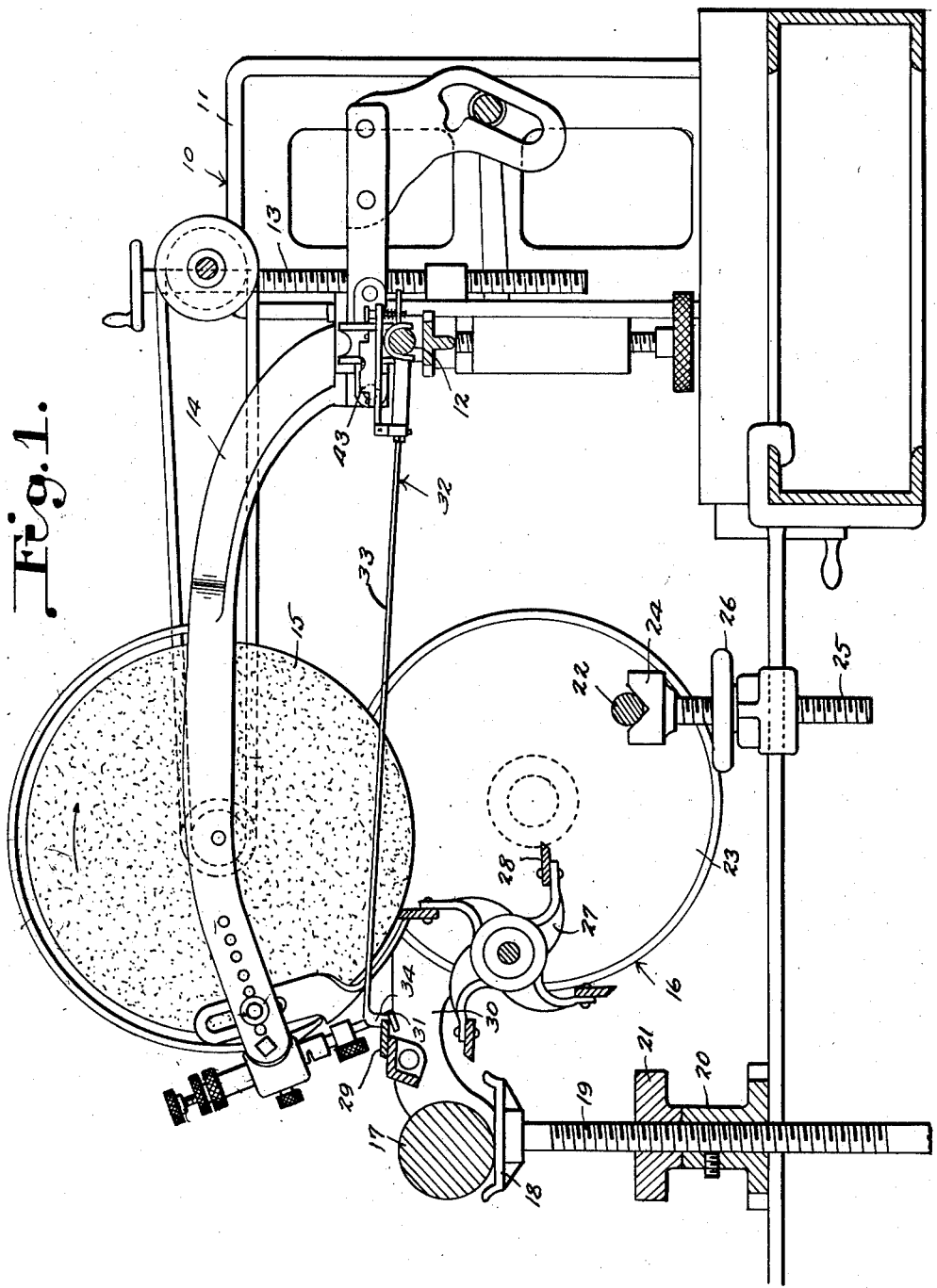
Figure 1 is a vertical section of lawn mower sharpening machine having a gauge constructed according to an embodiment of this invention, mounted thereon.

Referring to the drawings, the numeral 10 designates generally a lawn mower sharpening machine of the type embodied in my co-pending application, Serial No. 300,406 now Patent No. 2,755,600, issued July 24, 1956. In the lawn mower sharpening machine there is disclosed a frame structure 11 with a vertically adjustable rail 12 which is adjustable by means of a jack screw 13. The machine 10 also includes a grinding wheel supporting arm 14 on which a grinding wheel 15 is rotatably mounted. A lawn mower generally indicated at 16 is adapted to be supported in an inverted position in the machine 10 and as shown in Fig. 1 the lawn mower 16 is inverted with the roller 17 engaging supporting saddles 18 which are carried by screw shafts 19. The shafts 19 are extended downwardly through a post 20 and a shaft adjusting nut 21 is threaded on the shaft 19. The lawn mower 16 also includes a front cross bar or frame member 22 which is secured between the sides 23. The bar 22 is supported in one or more saddles 24 carried by a vertically adjustable screw shaft 25. The shaft 25 has threaded thereon a nut 26 by means of which the saddle 24 may be raised or lowered. The lawn mower 16 also includes a cutting reel 27 having a plurality of spiral cutting blades 28 which are adapted to rotate in cutting relation with respect to a stationary blade 29 disposed between the side arms 30 of the lawn mower frame structure. The grinding wheel carrying arm 14 is adjustably supported relative to the blade 29 by means of a gauge member 31. The structure herein described is embodied in my co-pending application and is herein shown in order that the use of the gauge to be hereinafter described may be readily understood.

In setting up the machine 10 with the lawn mower 16 the rail 12 is leveled and the roller 17 of the lawn mower is also leveled. The correct vertical position of the reel 27 is determined by means of a gauge generally indicated at 32. The gauge 32 includes an elongated straight bar 33 which is formed with a downwardly extending member 34 at one end thereof and the member 34 is provided with a catch 35 in which the adjacent edge of the cutting blade 29 is adapted to engage. The bar 33 is threaded as indicated at 36 at its other end and is threadedly extended into an elongated sleeve 37. The rod 33 is locked relative to the sleeve 37 by means of a lock nut 38.

The sleeve 37 has secured to or formed integral with the rear end thereof an inverted U-shaped saddle 39 which is adapted to engage over the rail 12. The saddle 39 has extending from the rear leg 40 thereof an arm 41 having an opening 42 adjacent the rear thereof by means of which the gauge may be suspended from a suitable support. A spirit level 43 of conventional construction is disposed above the sleeve 37 and the saddle 39. The spirit level 43 is secured to a bar 44 which is pivoted between a pair of hinge barrels 45 carried by an upwardly projecting lug 46. The lug 46 is fixed to the sleeve 37 by means of a set screw 47. A level adjusting screw 48 is loosely extended through the rear end of the bar 44 and is threaded through the arm 41. A spring 49 is interposed between the bar 44 and the arm 41. The spirit level 43 provides a means whereby the lawn mower 44 may be accurately adjusted in the machine and also provides a means whereby the adjustment of rail 12 may be effected to accommodate the wear down of the grinding wheel 15.

In the use of the gauge hereinbefore described, the lawn mower 16 is initially supported in the shaft shown on the saddles 18 and 24. The rail 12 is adjusted as to the length thereof so as to be disposed in a horizontal position and the roller 17 of the lawn mower is adjusted so as to be disposed in a horizontal position. The proper vertical position of the lawn mower is determined by means of the gauge 32 which is extended over the rail 12 and engaged with the stationary cutter bar 29. If in the initial adjustment of the rail 12 and the lawn mower 16, the spirit level 43 is not in a level position, the lawn mower 16 can be adjusted up or down and in like manner the rail 12 may also be vertically adjusted. The spirit level 43 can be rocked with the arm 44 by adjustment of screw 48, the arm or bar 44 rocking the hinge pin 50.

What is claimed is:

1. A level gauge for use with a lawn mower sharpening machine comprising an elongated rod, a head at one end of said rod engageable with a portion of the mower, a tubular member threaded on the other end of said rod, an inverted U-shaped saddle carried by said member and engageable with a portion of the machine, an elongated bar pivotally secured at one end relative to said member and projecting over said saddle, a spirit level carried by said bar; and means adjusting the angular relation of said bar relative to the length of said rod and tubular member.

2. A level gauge for use with a lawn mower sharpening machine comprising an elongated rod, a head at one end of said rod engageable with a portion of the mower, a tubular member threaded on the other end of said rod, an inverted U-shaped saddle carried by said member projecting at right angles to said member and engageable with a portion of the machine, an elongated bar pivotally secured at one end relative to said member and projecting over said saddle, a spirit level carried by said bar, and means adjusting the angular relation of said bar relative to the length of said rod and tubular member.

References Cited in the file of this patent

UNITED STATES PATENTS

| | | |
|---|---|---|
| 52,579 | Ledig | Feb. 13, 1886 |
| 2,569,873 | Stacey | Oct. 2, 1951 |